United States Patent [19]

MacMillan

[11] Patent Number: 5,611,243

[45] Date of Patent: Mar. 18, 1997

[54] PISTON ADVANCE MECHANISM FOR AUTOMATIC TAPER

[76] Inventor: Donald M. MacMillan, 3296 Rockhill Place, Clearbrook, BC, Canada, V2 S 5J7

[21] Appl. No.: 239,959

[22] Filed: May 9, 1994

[51] Int. Cl.$^6$ ............................. F16H 29/08; B44C 7/02; B67D 5/46

[52] U.S. Cl. ............................. 74/119; 74/116; 74/833; 156/575; 222/391

[58] Field of Search ............................. 74/116, 117, 118, 74/119, 129, 833; 156/524, 575, 577, 579; 222/391

[56] References Cited

U.S. PATENT DOCUMENTS

| | | | |
|---|---|---|---|
| 1,911,156 | 5/1933 | Laing | 74/119 |
| 2,373,785 | 4/1945 | Seaboly | 74/116 X |
| 2,997,888 | 8/1961 | Rust, Jr. | 74/119 |
| 4,086,121 | 4/1978 | Ames | 156/526 |
| 4,127,434 | 11/1978 | Lass | 156/526 |
| 4,273,269 | 6/1981 | Davis, Jr. | 222/391 X |
| 4,471,888 | 9/1984 | Herb et al. | 74/128 X |
| 4,652,331 | 3/1987 | Plasencia | 156/577 X |

Primary Examiner—Allan D. Herrmann
Attorney, Agent, or Firm—Robert W. Jenny

[57] ABSTRACT

The mechanism consists of a crankshaft and connecting rods driving two rods which extend through the full length of the cylinder of the taper. The rods reciprocate 180° out of phase with each other and pass through a piston assembly. Clutch mechanisms in the piston assembly engage when the rods are moving toward the head assembly and do not engage for the opposite motion. As a result the piston assembly advances toward the head assembly an increment of motion each time one of the rods moves in that direction. A mechanism in the piston assembly engages the head end of the cylinder as the piston assembly approaches the head end and prevents the clutches from engaging so that the piston assembly does not jam against the head end of the cylinder. Also, mechanism is provided to disengage both clutches and keep them disengaged so that the piston assembly is free to move as the cylinder is being filled. This mechanism involves rotating the rods to drive cams which engage the clutches to hold them disengaged. An alternate driving mechanism between the crankshaft and the oscillating rods enables adjustment of the amount of motion of the rods for turn of the crankshaft.

2 Claims, 2 Drawing Sheets

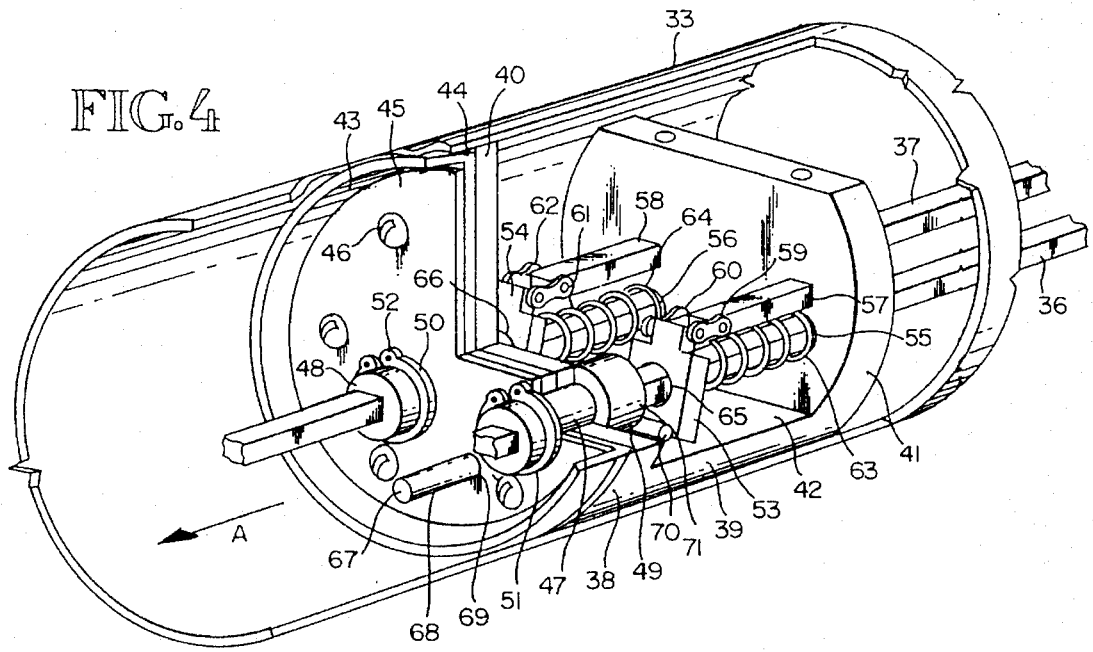
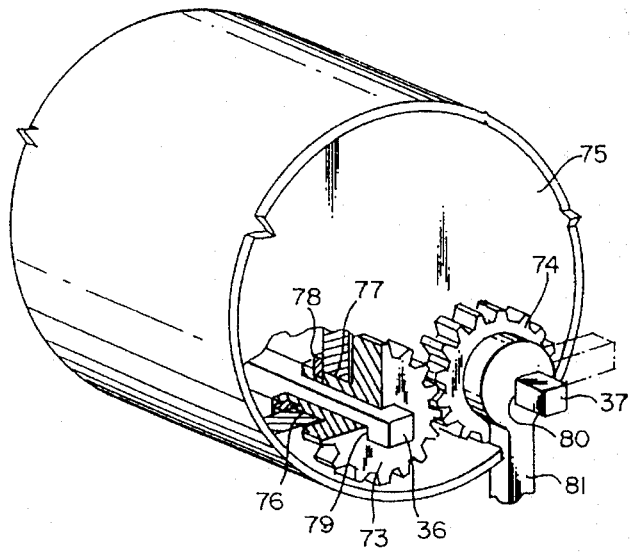
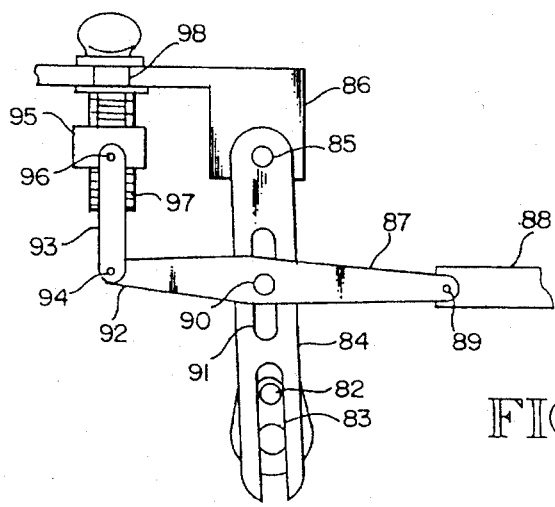

PISTON ADVANCE MECHANISM FOR AUTOMATIC TAPER

BACKGROUND OF THE INVENTION

1. Field

This invention relates to the field of apparatuses in which a piston in a cylinder is advanced to force contents of the cylinder out of the cylinder. More specifically it is in the field of drywall construction apparatus incorporating a cylinder and piston with the piston being mechanically advanced to force contents of the cylinder out of the cylinder. Still more specifically it is in the field of automatic tapers used in drywall construction, such automatic tapers having a cylinder and a piston in that cylinder mechanically advanced to dispense taping compound known as mud onto a joint between drywall panels being taped.

2. Prior Art

The direct prior art to the subject invention is formed in the automatic tapers marketed by Ames Drywall Systems, Inc. in the United States and Concorde Tool Company, Inc. in Canada. In such tools a roller assembly at the dispensing end of the tool is pressed against and rolled along the work surface. The roller pulls tape off a roll of tape on the cylinder/handle of the tool and a spool, clutch driven by the roller, reels in a cable to pull the piston through the cylinder to dispense mud onto the tape being applied. As the piston comes near to the end of the cylinder, mechanism declutches the spool from the roller and intermediate drawing mechanism so that the cable will not be strained or broken when the piston can move no farther. Service records of these tools clearly indicate that the piston advance mechanism is unduly prone to fail and/or malfunction and that time and cost to service and repair the mechanism are undesirably high. Also, the amount of piston advance and resultant quantity of mud dispensed per unit of travel of the taper head is not adjustable. Accordingly, the prime objective of the subject invention is to provide a piston advance mechanism for automatic tapers which is more durable and easier and less costly to service than conventional piston advance mechanisms. Another objective is that the mechanism be adjustable to control the ratio of piston advance to advancement of the taper in use.

SUMMARY OF THE INVENTION

The subject invention is a piston advance mechanism for automatic tapers. The spool of the conventional head assembly of an automatic taper is replaced by a two throw crankshaft. The crankshaft is driven by the roller assembly by chain and sprockets with no clutch needed between the crankshaft drive sprocket and the crankshaft. There is a connecting rod on each throw and each connecting rod is attached to a rod which extends the length of the cylinder of the taper, parallel to the centerline of the cylinder. Both rods extend through a piston assembly. Each rod is interconnected to the piston assembly by a one way clutch mechanism which operates such that axial displacements of the rod can only move the piston assembly toward the head end of the cylinder. As the crankshaft is rotated by rotation of the roller the rods are reciprocated 180° out of phase with each other and the rods alternately engage the piston and move it toward the head end of the cylinder. One end of a rod extends from the head end of the piston assembly and a crossbar at the other end of the rod is positioned to engage the clutch mechanisms and render them inoperative. When the piston assembly approaches the head end of the cylinder the rod contacts the head of the cylinder and is deflected to move the crossbar to disengage the clutches so that the piston assembly is driven only far enough to empty the cylinder.

The cylinder is refilled through a port at the head end and the piston assembly must be disengaged from the rods as it moves along the cylinder and rods as the cylinder is filled. This disengagement is achieved as follows: The rods have square cross-sectional shapes and pass through square openings in cylindrical bushings in the piston assembly. The faces of the bushings facing the clutch mechanisms are specially shaped cams. Rotating the rods rotates the cams such that they engage the clutch mechanisms and hold them disengaged. The rods extend through a bulkhead at the non-head end of the cylinder and are geared together. A lever extends radially from one gear and moving that lever rotates both rods 90°, disengaging the clutches to permit free movement of the piston assembly for loading the cylinder.

A preferred clutch mechanism comprises a plate in the shape of a rectangular block with a cylindrical hole through it normal to the broad faces of the block. The rod runs through the hole with slight clearance between the block and the four corners of the rod. The block is pivoted at one of its ends to fixed structure attached to the basic part of the piston assembly. When the block is cocked on the rod it locks to the rod and a spring around the rod holds the block cocked and in the engaged state. Motion of the rod relative to the block in the direction of the spring force reinforces the engagement of the clutch and carries the piston assembly with it. Motion of the rod in the other direction disengages the clutch and allows the rod to move through the piston assembly. Pivoting the block against the spring force disengages the clutch and the crossbar and cams described above pivot the block to disengage the clutch.

There are pivotal connections near or in the connections of the connecting rods to the advance rods to allow the advance rods to turn without rotating the connecting rods. The gears and lever which rotate the rods are carried in journals in the bulkhead and the rods slide axially in the gear hubs.

In a preferred embodiment, to provide adjustment of the ratio of piston travel to roller travel, a lever mechanism is installed between the connecting rods and the crankshaft. One end of each lever is pivoted to fixed structure and their other ends engage the throws on the crankshaft so that rotation of the crankshaft causes the rods to swing reciprocally on their pivots. The wrist pins of the connecting rods engage slots in the shanks of the levers. Adjustment mechanism is provided to adjust the location of the wrist pins in the slots. Moving the wrist pins toward the pinned ends of the slots reduces the reciprocating stroke of the rod and moving the pins toward the crankshaft ends of the levers increases the strokes of the rods.

The invention is described in more detail below with reference to the attached drawings.

BRIEF DESCRIPTION OF THE DRAWINGS

FIG. 4 illustrates the piston assembly.

FIG. 5 illustrates the rod actuation mechanism for disengaging the clutches in the piston assembly.

FIG. 6 schematically illustrates mechanism providing adjustability of the ratio of piston advance distance to roller travel.

DETAILED DESCRIPTION OF THE INVENTION

Figure 1:
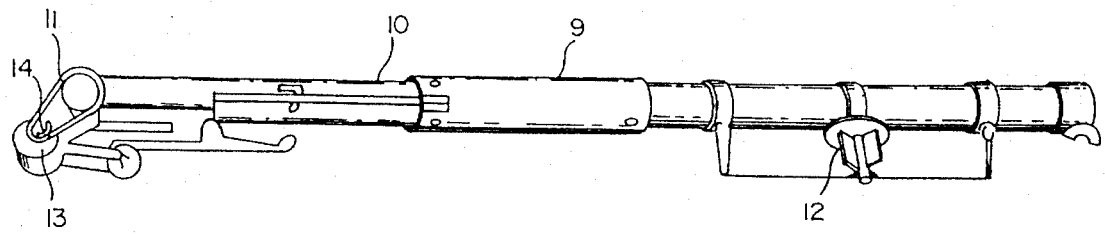
FIG. 1 is a sketch of an automatic taper to illustrate the general configuration.
Figure 2:
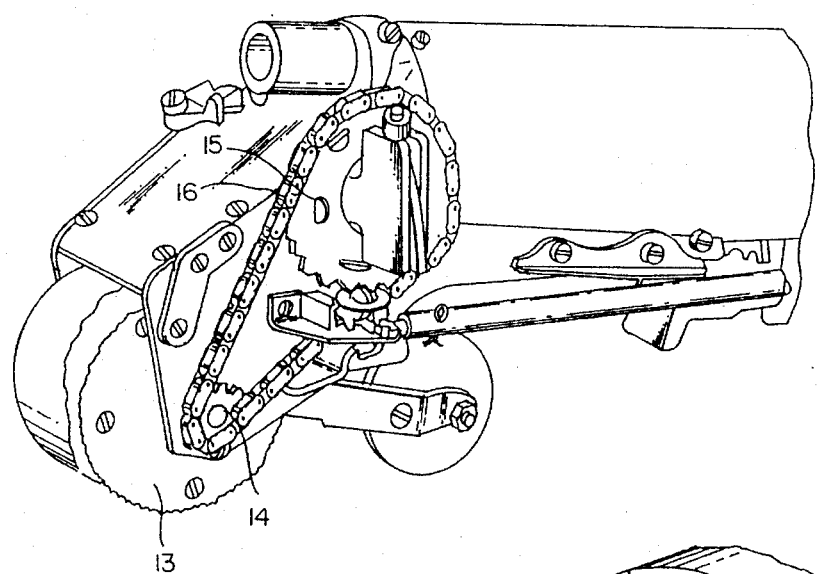
FIG. 2 illustrates the head assembly of an automatic taper.
Figure 3:
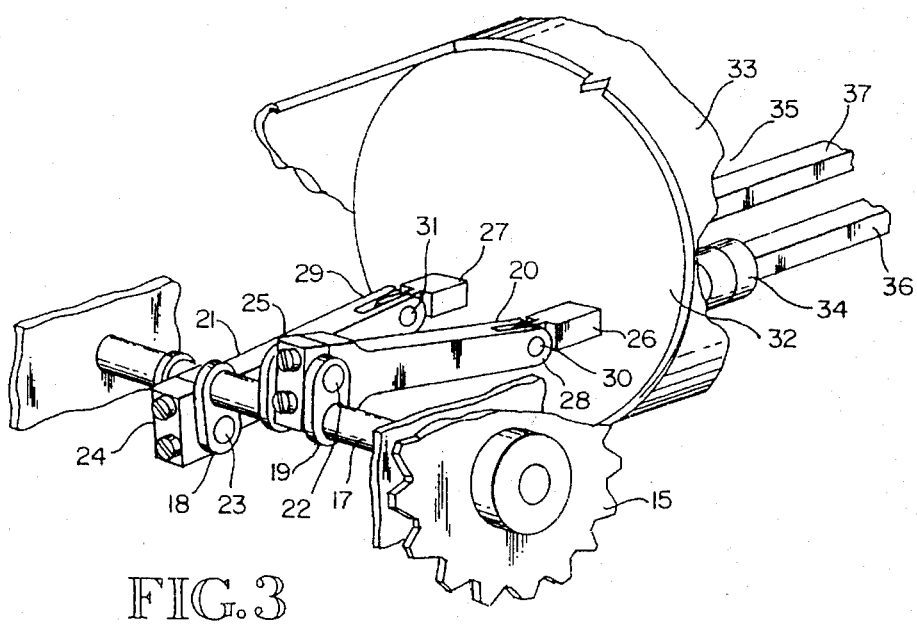
FIG. 3 illustrates the drive mechanism for the piston advancement rods.

The subject invention is a piston advance mechanism for an automatic taper. FIG. 1 illustrates an automatic taper 9, comprising a cylinder assembly 10 which serves as a handle for the taper and a head assembly 11 from which the tape and compound known as mud are dispensed. A roll of tape is carried on hub 12 on the cylinder assembly. FIG. 2 illustrates the head assembly 11 in more detail. In use the roller assembly 13 is pressed against and moved along a surface, causing the roller to turn and drive sprocket 14 which drives sprocket 15 via chain 16. Referring to FIG. 3 sprocket 15 turns crankshaft 17 which has throws 18 and 19 180° apart. Connecting rod assemblies 20 and 21 are attached to crank pins 22 and 23 at their crank pin ends 24 and 25 and to rods 26 and 27 respectively at their piston pin ends 28 and 29 by pins 30 and 31. As the crankshaft turns the rods are reciprocated 180° out of phase with each other. Rods 26 and 27 are supported in bulkhead fitting 32 which is mounted in cylinder 33 of the cylinder assembly. Assemblies 34 and 35 allow rods 36 and 37 to be rotated (for purposes described later) independently of rods 26 and 27 while transmitting tension and compression forces between the rods connected to each assembly.

Rods 36 and 37 extend through the piston assembly 38 shown in FIG. 4. The piston assembly comprises carriage 39 which fits closely but freely in the cylinder 33, and comprises portions 40 and 41 interconnected by keel portion 42. Cup seal 43 is held to face 44 of portion 40, facing the head end of the cylinder, by plate 45 which, in turn, is fastened to portion 40 by fasteners, fastener 46 being typical. Bushings 47 and 48 pass through the plate, seal 43 and portion 40 in holes 49 and 50 (not visible in this view) and are held in place by snap rings 51 and 52. The rods pass through the bushings, clutch plates 53 and 54 and holes 55 and 56 in portion 41 of the carriage 39. The clutch plates are supported from posts 57 and 58 extending from portion 41 by links 59, 60, 61 and 62. Springs 63 and 64 force the plates to rock on the linked connection until the peripheries of holes 65 and 66 contact the corners of the rods. With this arrangement, when either rod moves in the direction indicated by arrow A, i.e. toward the head assembly, the clutch plate 53 or 54 on that rod 36 or 37 will engage the rod and the piston assembly will move with the rod. When the rods move in the direction away from the head assembly, the clutches do not engage. In this way reciprocation of the rods produced by rotation of the crankshaft causes the piston assembly to advance toward the head assembly. When the piston assembly approaches bulkhead fitting 32, end 67 of rod 68 which extends through hole 69 in the plate, the seal and portion 40 of the carriage, contacts the bulkhead fitting. Crossbar 70 is attached to the other end of rod 68. When the reciprocating rods tend to move the piston assembly closer to the bulkhead fitting, rod 68 is pushed, pushing the crossbar which in turn pushes the clutch plates to disengage them from the reciprocating rods. In this way the piston assembly is automatically disengaged from the reciprocating rods when the cylinder is almost emptied of mud.

To disengage the piston assembly from the rods for purposes of refilling the cylinder the rods are rotated by mechanism explained below, turning bushings 47 and 48 with them. Faces 71 and 72 (not visible in this view) are shaped such that when they are rotated a designated amount they engage the clutch plates to hold them disengaged from the rods. The piston assembly is then free to move through the cylinder as mud is pumped into the cylinder in front of the piston assembly.

FIG. 5 illustrates the mechanism for turning the rods. Gears 73 and 74 are mounted in cylinder bulkhead 75 on their hubs, hub 76 showing in this view, the hubs being retained in holes in the bulkhead, hole 77 showing in this view, by snap rings, snap ring 78 showing. The rods extend through and reciprocate in holes 79 and 80 in the gears. Lever 81 is attached to gear 74 so that moving the lever from the position indicated in solid lines to that indicated in phantom lines provides the rotation of the rods needed to engage and disengage the piston assembly from the rods, recognizing that each gear drives a rod rotationally because the square cross sectional shaped rods engage the square shaped holes 79 and 80 in gears 73 and 74.

FIG. 6 is a schematic diagram of mechanism for activating the rods which allows adjustment of the amount of movement transferred to the rods from the crankshaft. Crank pin 82 engages slot 83 in lever 84 which is pivoted at 85 to fixed structure 86. Connecting lever 87 is pivoted to advance rod 88 at 89 and, by pin 90, engages slot 91 in lever 84. End 92 of lever 87 is pivoted to link 93 at 94 and link 93 is pivoted on block 95 at 96. Block 95 is threaded onto screw 97 which is attached to and is rotatable in hole 98 in structure 86. It is considered to be understandable from this diagram that moving block 95 along screw 97 by turning the screw will adjust the amount of linear motion transmitted to rod 88 by a turn of the crankshaft. Raising block 95 (in this view) decreases the travel of the rod. Lowering the block increases the travel.

It is believed to be understandable from the above description that the subject invention meets its objectives. It provides a durable piston advance mechanism for automatic tapers which can be easily and inexpensively serviced. Also, the mechanism can be made adjustable to control the ratio of piston advance to advancement of the taper in use.

It is also considered to be understood that while certain embodiments of the invention are disclosed herein, other embodiments and modifications of those disclosed are possible within the scope of the subject invention which is limited only by the attached claims.

I claim:

1. In an automatic taper having a piston, a mechanism for advancing said piston in said automatic taper, said taper further comprising a head assembly having a roller assembly and a cylinder assembly having a cylinder, said cylinder having a length, said piston being part of a piston assembly movable in said cylinder, said mechanism comprising first and second rods supported in said cylinder and extending lengthwise in said cylinder and through said piston assembly, means for reciprocating said rods lengthwise in said cylinder, toward and away from said head assembly, said means for reciprocating being driven by said roller assembly, said piston assembly further comprising clutch means which are mechanically disengagable and automatically engage to connect said piston assembly to said first and second rods when said rods are moving toward said head assembly, said mechanism further comprising means for mechanically disengaging said clutches when said piston assembly is advanced close to said head assembly and further mechanical means for disengaging said clutches such that said piston assembly is free to move through said length of said cylinder.

2. The mechanism of claim 1 in which said first and second rods reciprocate a distance for each revolution of said crankshaft, said mechanism further comprising means for adjusting said distance.

\* \* \* \* \*